United States Patent
Aronovich et al.

(10) Patent No.: US 10,296,390 B2
(45) Date of Patent: May 21, 2019

(54) FEEDBACK MECHANISM FOR CONTROLLING DISPATCHING WORK TASKS IN A MULTI-TIER STORAGE ENVIRONMENT

(71) Applicant: International Business Machines Corporation, Armonk, NY (US)

(72) Inventors: Lior Aronovich, Thornhill (CA); Samuel M. Black, Aurora (CA)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 15/293,843

(22) Filed: Oct. 14, 2016

(65) Prior Publication Data

US 2018/0107517 A1  Apr. 19, 2018

(51) Int. Cl.
G06F 9/48 (2006.01)
G06F 9/50 (2006.01)

(52) U.S. Cl.
CPC .......... *G06F 9/5016* (2013.01); *G06F 9/4843* (2013.01); *G06F 9/5005* (2013.01)

(58) Field of Classification Search
None
See application file for complete search history.

(56) References Cited

U.S. PATENT DOCUMENTS

| | | | |
|---|---|---|---|
| 7,865,894 B1 | 1/2011 | Nordquist et al. | |
| 8,234,643 B2 | 7/2012 | Neichev | |
| 8,370,312 B1* | 2/2013 | Sawhney | H04L 67/1097 707/694 |
| 8,433,848 B1 | 4/2013 | Naamad et al. | |
| 8,706,962 B2 | 4/2014 | Belluomini et al. | |
| 8,930,543 B2 | 1/2015 | Ashok et al. | |
| 9,515,956 B2 | 12/2016 | Hu et al. | |
| 9,612,874 B1* | 4/2017 | Khafizova | G06F 9/5038 |
| 9,811,529 B1* | 11/2017 | Rus | G06F 17/30194 |
| 2007/0143460 A1 | 6/2007 | Ben-David et al. | |
| 2007/0198613 A1* | 8/2007 | Prahlad | G06F 3/0605 |
| 2010/0121828 A1* | 5/2010 | Wang | G06F 17/30233 707/694 |

(Continued)

OTHER PUBLICATIONS

Appendix P List of IBM Patents or Applications Treated as Related. Dated Dec. 28, 2017. Two pages.

(Continued)

*Primary Examiner* — Lewis A Bullock, Jr.
*Assistant Examiner* — Bruce S Ashley
(74) *Attorney, Agent, or Firm* — Edward P. Li

(57) ABSTRACT

A method, a computer program product, and a computer system for controlling dispatching work tasks in a multi-tier storage environment. A computer system receives storage demands of work tasks. The computer system determines placement and migration policies for data in storage tiers in a storage system. The computer system prepares the storage tiers for meeting the storage demands of work tasks, based on the placement and migration policies. The computer system determines a state of preparation of the storage tiers for meeting the storage demands of work tasks. The computer system determines a list including work tasks that can proceed and work tasks that cannot proceed, based on the state of the preparation. The computer system modifies a schedule of the work tasks, based on the list.

9 Claims, 4 Drawing Sheets

(56) References Cited

U.S. PATENT DOCUMENTS

2011/0154357 A1 6/2011 Welerdiek
2011/0213755 A1 9/2011 Kavuri et al.
2016/0335134 A1 11/2016 Gupta et al.

OTHER PUBLICATIONS

Aronovich et al. Original U.S. Appl. No. 15/844,587, filed Dec. 17, 2017.

"IBM Spectrum Scale", IBM, Produced in the United States of America, Jul. 2016, © Copyright IBM Corporation 2016, 8 pages.

* cited by examiner

# FEEDBACK MECHANISM FOR CONTROLLING DISPATCHING WORK TASKS IN A MULTI-TIER STORAGE ENVIRONMENT

BACKGROUND

The present invention relates generally to computer system management, and more particularly to feedback mechanism for controlling dispatching work tasks in a multi-tier storage environment.

As a storage system enforces its migration policies in order to better serve its users, time is required to prepare storage tiers. The time needed is a function of the amount of data that has to be moved between the storage tiers. Currently, a workload manager handling the dispatch of work using the storage tiers has no awareness of whether the storage system is undertaking to prepare the storage tiers to run the work. The workload manager will simply dispatch work when there are resources (CPU and Memory) to execute the work. The storage system may be in the process of migrating data to provide better workload throughput, and the process may not have been completed.

IBM Spectrum Scale™ provides tiered storage solutions. The solutions provide a policy language that can be used to govern the initial placement and migration of files placed on the storage. The policy language has access to information about the files it contains, and the rules can be constructed using that information. The policies are created by a storage administrator. The policies are able to use the file access time and calendar information to determine where data should be placed and where it should be moved to. The solutions are static. IBM Spectrum Scale™ does not have information about how the workload manager wants to use those storage tier resources. IBM Spectrum Scale™ is not able to overcommit the storage tiers because it has no knowledge about when and for how long the storage tiers will be used.

IBM Storwize® V7000 storage systems provide a simple to use means of defining storage tiers. It also automatically moves frequently accessed data to higher performance tiers. IBM Spectrum Control™ performs analytics on the storage tiers and can make recommendations on how to structure the data tiers. The administrator can use the recommendations to restructure the tiers. Spectrum Control™ provides a value to traditional storage solutions; however, Spectrum Control™ cannot handle the dynamic nature of the work which needs the storage, and it needs administrative intervention. EMC, HP and others use deduplication and compression to improve storage performance; however, they do not consider the workload scheduler.

SUMMARY

In one aspect, a method for controlling dispatching work tasks in a multi-tier storage environment is provided. The method comprises receiving, by a computer system, storage demands of work tasks. The method further comprises determining, by the computer system, placement and migration policies for data in storage tiers in a storage system. The method further comprises preparing, by the computer system, the storage tiers for meeting the storage demands of work tasks, based on the placement and migration policies. The method further comprises determining, by the computer system, a state of preparation of the storage tiers for meeting the storage demands of work tasks. The method further comprises determining, by the computer system, a list including work tasks that can proceed and work tasks that cannot proceed, based on the state of the preparation. The method further comprises modifying, by the computer system, a schedule of the work tasks, based on the list.

In another aspect, a computer program product for controlling dispatching work tasks in a multi-tier storage environment is provided. The computer program product comprises a computer readable storage medium having program code embodied therewith. The program code is executable to receive, by a computer system, storage demands of work tasks. The program code is executable to determine, by the computer system, placement and migration policies for data in storage tiers in a storage system. The program code is executable to prepare, by the computer system, the storage tiers for meeting the storage demands of work tasks, based on the placement and migration policies. The program code is executable to determine, by the computer system, a state of preparation of the storage tiers for meeting the storage demands of work tasks. The program code is executable to determine, by the computer system, a list including work tasks that can proceed and work tasks that cannot proceed, based on the state of the preparation. The program code is executable to modify, by the computer system, a schedule of the work tasks, based on the list.

In yet another aspect, a computer system for controlling dispatching work tasks in a multi-tier storage environment is provided. The computer system comprises one or more processors, one or more computer readable tangible storage devices, and program instructions stored on at least one of the one or more computer readable tangible storage devices for execution by at least one of the one or more processors. The program instructions are executable to: receive storage demands of work tasks; determine placement and migration policies for data in storage tiers in a storage system; prepare the storage tiers for meeting the storage demands of work tasks, based on the placement and migration policies; determine a state of preparation of the storage tiers for meeting the storage demands of work tasks; determine a list including work tasks that can proceed and work tasks that cannot proceed, based on the state of the preparation; and modify a schedule of the work tasks, based on the list.

DETAILED DESCRIPTION

Embodiments of the present invention provide a feedback mechanism for controlling dispatching work tasks in a multi-tier storage environment. The feedback mechanism couples a storage system with a workload manager. Therefore, the workload manager can dispatch work tasks to the computers once the storage system is ready to accept resource demands created by running the work tasks. The feedback mechanism causes the workload manager to dispatch the work tasks when the storage system is better prepared to accept the work tasks. By creating a system to alter how the workload manager dispatches the work tasks, the storage system and workload manager can coordinate their responses to delay dispatch of work tasks that the storage system is currently preparing for. Once a work task is actually dispatched, it will use the best allocated storage tier and therefore run faster. The storage system and workload manager can coordinate their responses to throttle the dispatch of selected work tasks to reduce the demands on the storage system. This allows the storage system more time to complete its migrations while not overloading it with work tasks that overload the storage system. How the workload manager throttles the work tasks depends on how complete migrations of the storage system are done and how many work tasks the workload manager is waiting to dispatch.

By making the workload manager aware of the process and progress that the storage system is undertaking to prepare the storage tiers, the workload manager can adjust the algorithms for dispatching work to computers in a cluster. This in turn lets the work tasks run when the storage system is ready to accept the demands created by running the work tasks.

Figure 1:
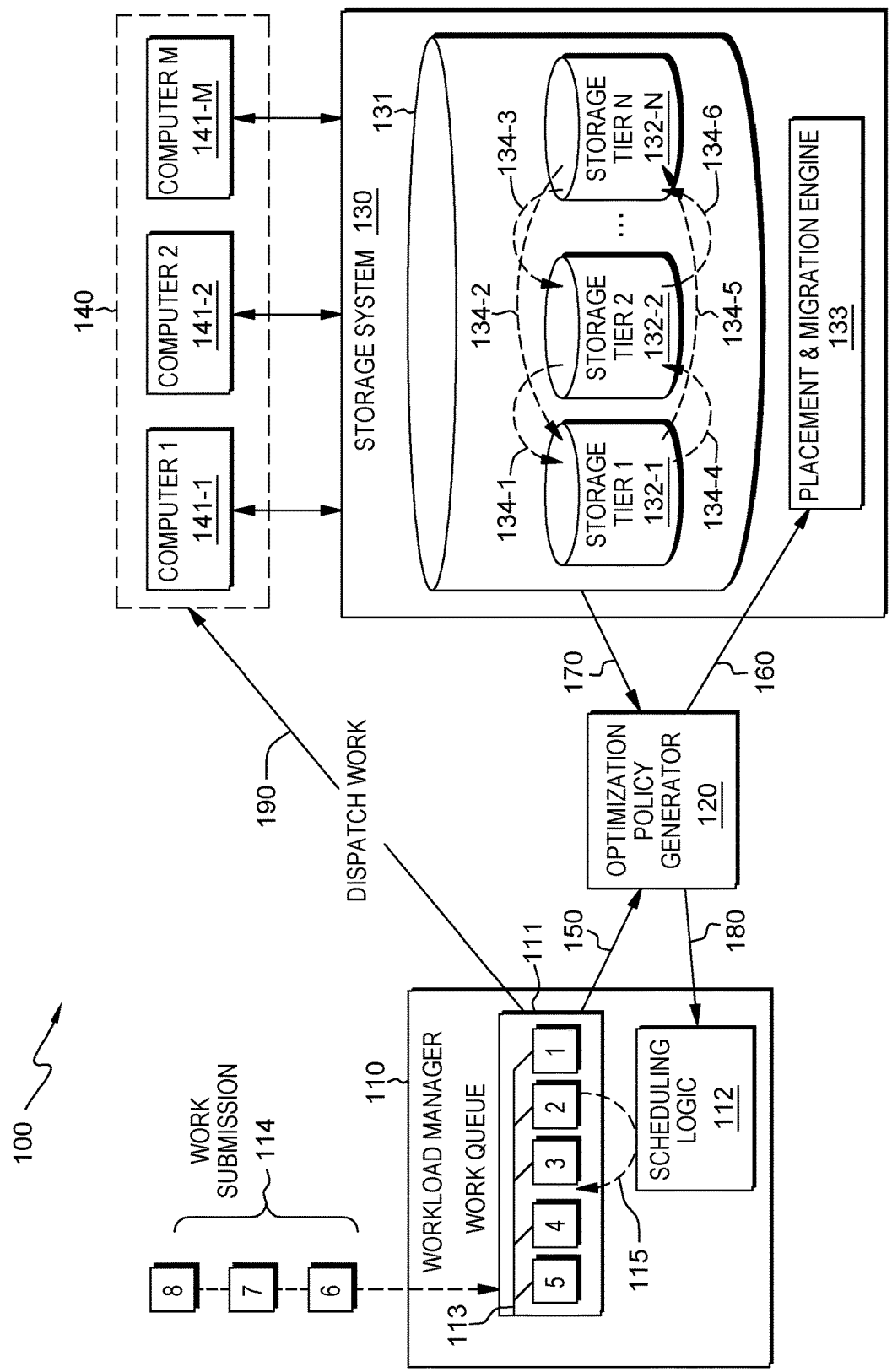
FIG. 1 is a diagram illustrating a system for controlling dispatching work tasks in a multi-tier storage environment, in accordance with one embodiment of the present invention.

FIG. 1 is a diagram illustrating system 100 for controlling dispatching work tasks in a multi-tier storage environment, in accordance with one embodiment of the present invention. System 100 comprises workload manager 110, optimization policy generator 120, storage system 130, and computer cluster 140 including computers 1, 2, . . . , and M (141-1, 141-2, . . . , and 141-M). Workload manager 110 comprises work queue 111 including work tasks 113. For the illustrative purpose, FIG. 1 shows work task 1 thorough 5 in work queue 111. Work submission 114 is sent by users to work queue 111. For the illustrative purpose, FIG. 1 shows work task 6 thorough 8 in work submission 114. Workload manager 110 further comprises scheduling logic 112. Workload manager 110 is responsible for sending storage demands of work tasks in work queue 111 to optimization policy generator 120, modifying work schedules in work queue 111, and dispatching the work tasks to computer cluster 140. Arrow line 150 denotes sending storage demands of work tasks in work queue 111 to optimization policy generator 120. Arrow line 190 denotes dispatching the work tasks to computer cluster 140. In one embodiment, modifying work schedules in work queue 111 is implemented by scheduling logic 112. For the illustrative purpose, dashed arrow line 115 shows the schedule of work task 2 is modified by scheduling logic 112 and rescheduled work task 2 comes after work task 3 in work queue 111.

Referring to FIG. 1, storage system 130 comprises storage device 131 including different storage tiers—storage tiers 1, 2, . . . , and N (132-1, 132-2, . . . , and 132-N). Storage tiers 1, 2, . . . , and N (132-1, 132-2, . . . , and 132-N) have different performance characteristics and costs. Storage demands of some work tasks in work queue 111 may need high-performance storage tiers where costs are high, while storage demands of other work tasks in work queue 111 may use storage tiers that are low-performance and less expensive. For example, the most frequently accessed data is stored on the highest performing storage tiers, while less accessed data is stored on low-performance and inexpensive storage tiers. Storage system 130 further comprises placement and migration engine 133. In order to prepare storage tiers 1, 2, . . . , and N (132-1, 132-2, . . . , and 132-N) for the storage demands of work tasks in work queue 111, placement and migration engine 133 places and migrates data among storage tiers 1, 2, . . . , and N (132-1, 132-2, . . . , and 132-N), according to directions for placement and migration of data in storage tiers 1, 2, . . . , and N (132-1, 132-2, . . . , and 132-N). Placement and migration engine 133 receives the directions from optimization policy generator 120. Arrow lines 134-1 through 134-6 denote the migration of data among storage tiers 1, 2, . . . , and N (132-1, 132-2, . . . , and 132-N). Storage system 130 sends a state of preparation of storage tiers 1, 2, . . . , and N (132-1, 132-2, . . . , and 132-N) to optimization policy generator 120. Arrow line 170 denotes sending the state of preparation from storage system 130 to optimization policy generator 120.

Referring to FIG. 1, optimization policy generator 120 computes how to restructure storage tiers in order to meet the storage demands of work tasks in work queue 111. Optimization policy generator 120 determines placement and migration policies for data in storage tiers 1, 2, . . . , and N (132-1, 132-2, . . . , and 132-N). Optimization policy generator 120 sends placement and migration engine 133 the directions for placement and migration of data in storage tiers 1, 2, . . . , and N (132-1, 132-2, . . . , and 132-N). Arrow line 160 denotes sending the directions from optimization policy generator 120 to placement and migration engine 133. Optimization policy generator 120 uses information about the state of preparation of storage tiers 1, 2, . . . , and N (132-1, 132-2, . . . , and 132-N) and information about the storage demands of work tasks in work queue 111 and determines how to react the storage preparation. Optimization policy generator 120 provides workload manager 110 a list that includes work tasks that can proceed and cannot proceed. Arrow line 180 denotes sending the list by optimization policy generator 120 to workload manager 110. Based on the list, workload manager 110 modifies work queue 111.

Figure 2:
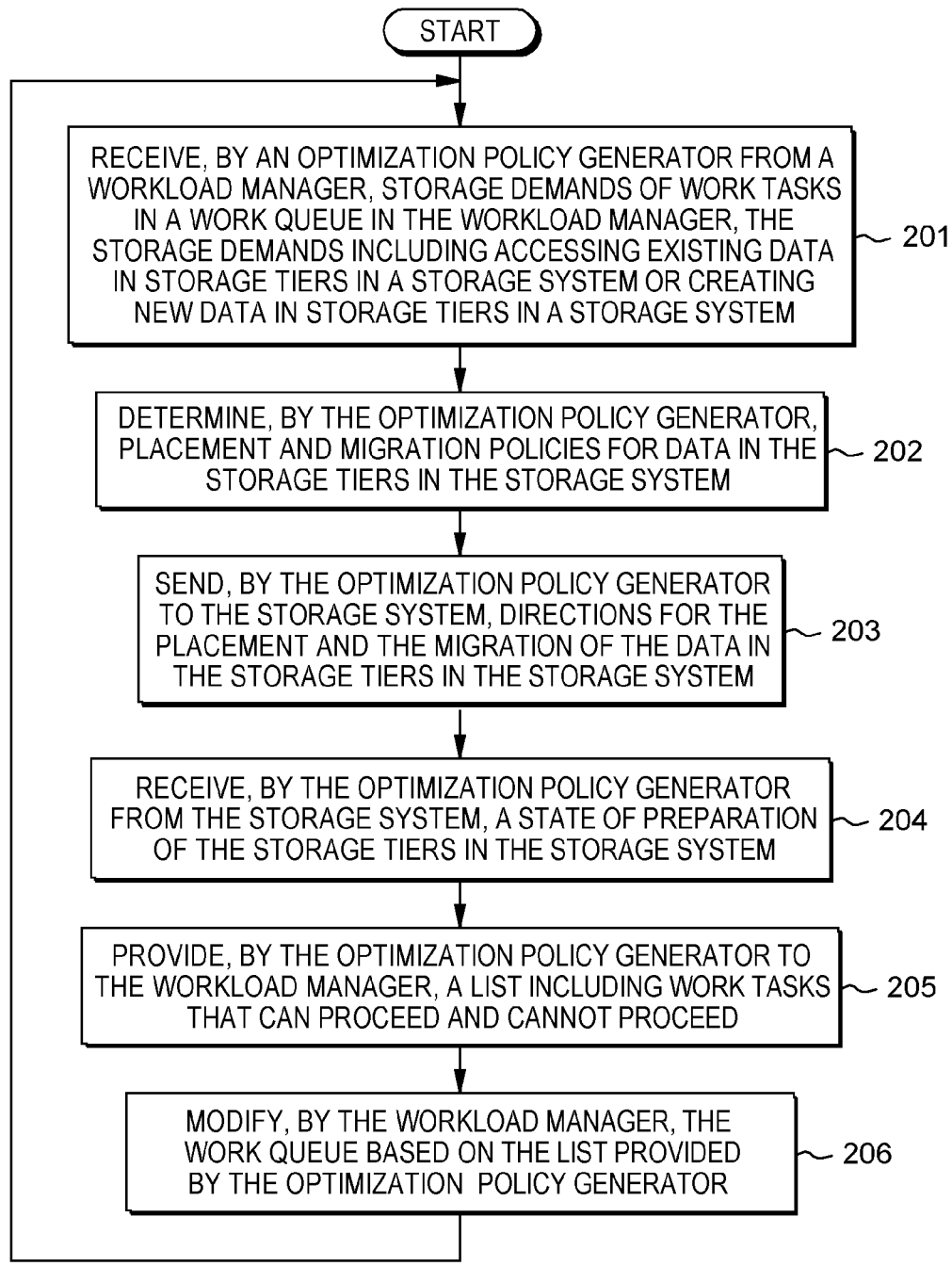
FIG. 2 is a flowchart showing operational steps for controlling dispatching work tasks in a multi-tier storage environment, in accordance with one embodiment of the present invention.

FIG. 2 is a flowchart showing operational steps for controlling dispatching work tasks in a multi-tier storage environment, in accordance with one embodiment of the present invention. At step 201, optimization policy generator 120 receives, from workload manager 110, storage demands of work tasks in work queue 111. The storage demands include accessing existing data in storage tiers 1, 2, . . . , and N (132-1, 132-2, . . . , and 132-N) in storage system 130 and creating new data in storage tiers 1, 2, . . . , and N (132-1, 132-2, . . . , and 132-N) in storage system 130. The storage demands are included in metadata associated with the work tasks. The storage demands have different requirements on the layout of the data in the storage tiers: a work task which needs to access existing data may demand data residing in a faster performing tier; a work task which needs to write a lot of data may demand sufficient space in a higher performing tier; a work task which needs high TOPS (input/output operations per second) may not share a storage tier with other work tasks.

At step 202, optimization policy generator 120 determines placement and migration policies for data in storage tiers 1, 2, . . . , and N (132-1, 132-2, . . . , and 132-N) in storage system 130. In this step, optimization policy generator 120 computes how to restructure storage tiers in order to meet the storage demands of work tasks in work queue 111. Step 203 will be discussed in detail with reference to FIG. 3 in later paragraphs of this document.

At step 203, optimization policy generator 120 sends to storage system 130 directions for placement and migration of the data in storage tiers 1, 2, . . . , and N (132-1, 132-2, . . . , and 132-N) in storage system 130. In one embodiment, according to directions for placement and migration of data in storage tiers 1, 2, . . . , and N (132-1, 132-2, . . . , and 132-N), placement and migration engine 133 in storage system 130 prepares storage tiers 1, 2, . . . , and N (132-1, 132-2, . . . , and 132-N) for the storage demands of work tasks. To prepare the storage tiers, placement and migration engine 133 places and migrates data among the storage tiers.

At step 204, optimization policy generator 120 receives from storage system 130 a state of preparation of storage tiers 1, 2, . . . , and N (132-1, 132-2, . . . , and 132-N) in storage system 130. Optimization policy generator 120 takes information about the state of the preparation and combines it with information about the storage demands of the work tasks. The information about the storage demands is received by optimization policy generator 120 from workload manager 110 at step 201. Then, optimization policy generator 120 computes which work can and cannot proceed, based on the storage demands of the work tasks and the capacity that has been created through the preparation. The process of preparing the storage tiers may require a period of time so that optimization policy generator 120 will allow a predetermined period of time to pass before evaluating which work can and cannot proceed. At step 205, optimization policy generator 120 provides workload manager 110 with a list including work tasks that can proceed and cannot proceed. At this step, optimization policy generator 120 determines how to react the state of the storage preparation.

At step 206, workload manager 110 modifies work queue 111 based on the list provided by optimization policy generator 120. In an embodiment, step 206 is implemented by scheduling logic 112 in workload manager 110 shown in FIG. 1. Workload manager 110 may do at least one of actions. Workload manager 110 dispatches work tasks for which the preparation of the storage tiers has been completed. Workload manager 110 delays dispatching work tasks for which the preparation of storage tiers has not been completed; delaying the work tasks provides storage system 130 more time to complete the preparation. For work tasks that can be throttled, workload manager 110 starts some portions of a work task in proportion to the amount of capacities (such as space and IOPS) that have been prepared. For example, if storage system 130 has prepared 25% of resources, workload manager 110 allows 25% of the workload to proceed. After step 206, steps 201-206 will reiterated for new submitted work tasks to workload manager 110.

Figure 3:
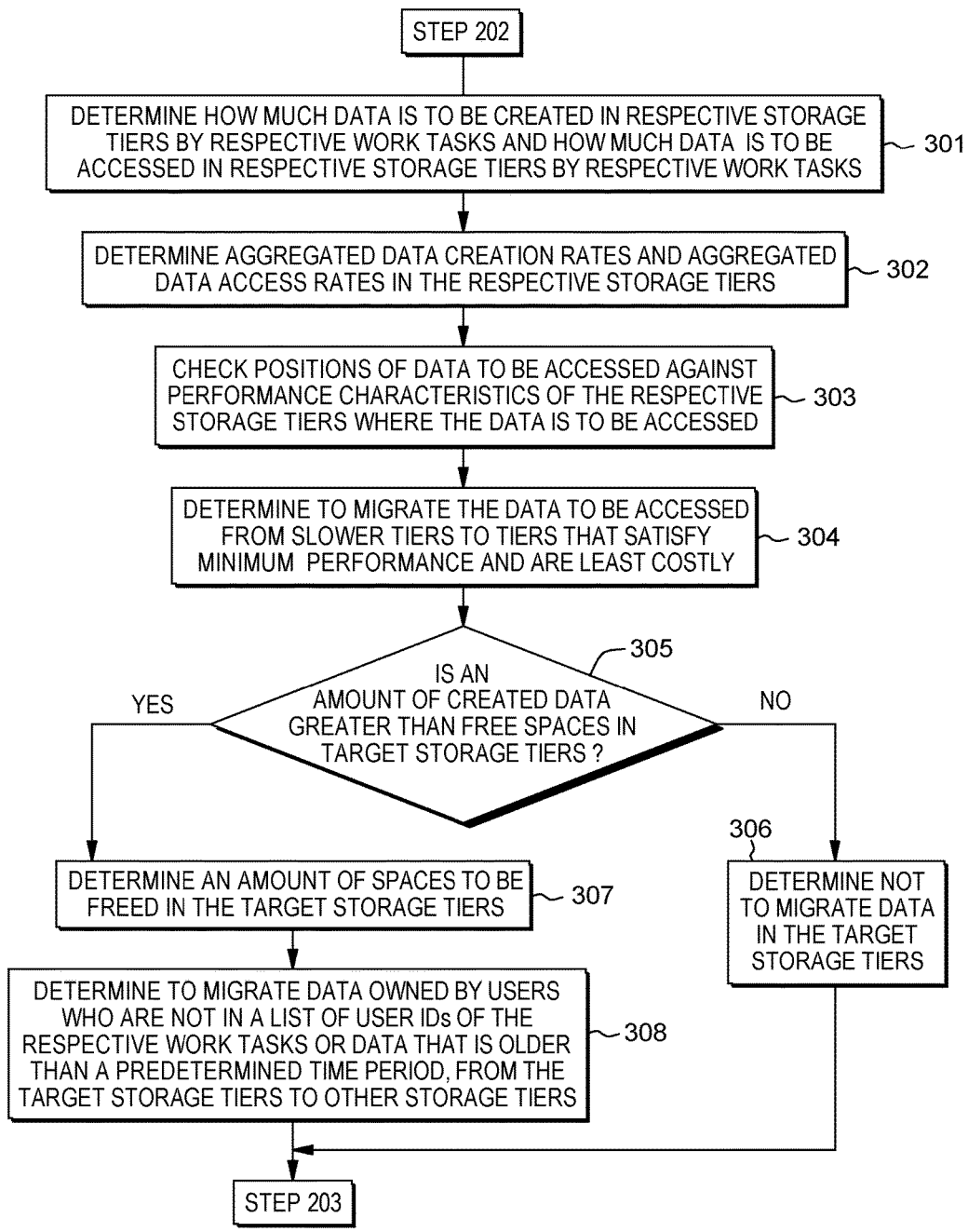
FIG. 3 is a flowchart showing operational steps for determining placement and migration policies for data in storage tiers in a storage system, in accordance with one embodiment of the present invention.

FIG. 3 is a flowchart showing operational steps for determining placement and migration policies for data in storage tiers in storage system, in accordance with one embodiment of the present invention. In FIG. 3, the operational steps are implementation of step 202 shown in FIG. 2. At step 301, optimization policy generator 120 determines how much data is to be created by respective work tasks on respective storage tiers (e.g., storage tiers 1, 2, . . . , and N (132-1, 132-2, . . . , and 132-N) shown in FIG. 1 and how much data is to be accessed by the respective work tasks on the respective storage tiers. At step 302, optimization policy generator 120 determines aggregated data creation rates and aggregated data access rates on the respective storage tiers. At step 303, optimization policy generator 120 checks positions of data to be accessed against performance characteristics of the respective storage tiers where the data is to be accessed. At step 304, optimization policy generator 120 determines to migrate the data to be accessed from slower tiers to tiers that satisfy minimum performance and are least costly. At step 305, optimization policy generator 120 determines whether an amount of created data is greater than free spaces in target storage tiers. In response to determining that the amount of the created data is greater than the free spaces in the target storage tiers (YES branch of block 305), at step 307, optimization policy generator 120 determines an amount of spaces to be freed in the target storage tiers. At step 308, optimization policy generator 120 determines to migrate data owned by users who are not in a list of user IDs of the work tasks or data that is older than a predetermined time period, from the target storage tiers to other storage tiers. To this step, optimization policy generator 120 completes step 202 shown in FIG. 2 and then executes step 203 shown in FIG. 2.

In response to determining that the amount of the created data is not greater than the free spaces in the target storage tiers (NO branch of block 305), at step 306, optimization policy generator 120 determines not to migrate the data in the target storage tiers. Then, optimization policy generator 120 executes step 203 shown in FIG. 2.

Figure 4:
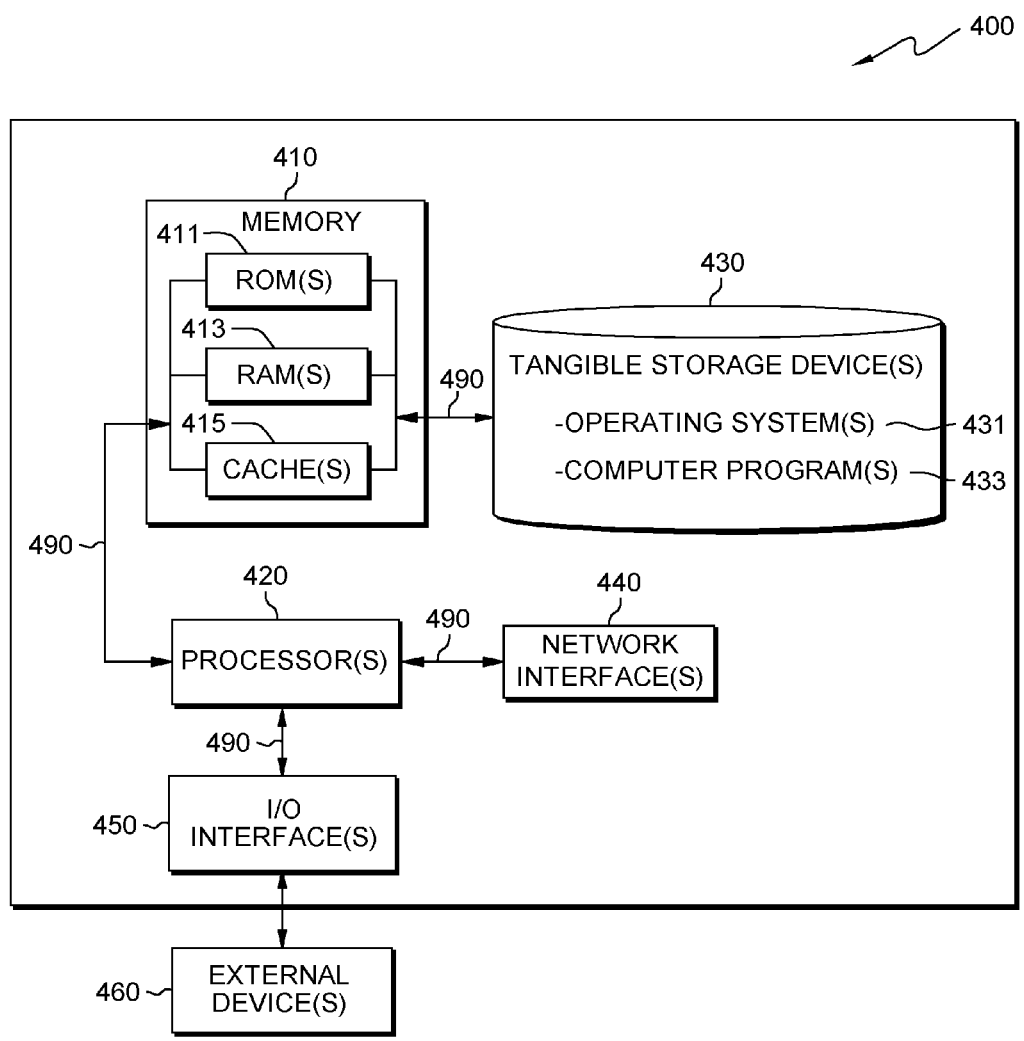
FIG. 4 is a diagram illustrating components of a computer device hosting a system for controlling dispatching work tasks in a multi-tier storage environment, in accordance with one embodiment of the present invention.

FIG. 4 is a diagram illustrating components of computer device 400 hosting system 100 for controlling dispatching work tasks in a multi-tier storage environment, in accordance with one embodiment of the present invention. It should be appreciated that FIG. 4 provides only an illustration of one implementation and does not imply any limitations with regard to the environment in which different embodiments may be implemented. The device may be any electronic device or computing system capable of receiving input from a user, executing computer program instructions, and communicating with another electronic device or computing system via a network. In one embodiment, workload manager 110, optimization policy generator 120, and storage system 130 may reside on one computer device. In another embodiment, workload manager 110, optimization policy generator 120, and storage system 130 may reside on separate computer devices connected by a computer network.

Referring to FIG. 4, computer device 400 includes processor(s) 420, memory 410, and tangible storage device(s) 430. In FIG. 4, communications among the above-mentioned components of computer device 400 are denoted by numeral 490. Memory 410 includes ROM(s) (Read Only Memory) 411, RAM(s) (Random Access Memory) 413, and cache(s) 415. One or more operating systems 431 and one or more computer programs 433 reside on one or more computer readable tangible storage device(s) 430. Workload manager 110, optimization policy generator 120, and storage system 130 reside on one or more computer readable tangible storage device(s) 430. Computer device 400 further includes I/O interface(s) 450. I/O interface(s) 450 allows for input and output of data with external device(s) 460 that may be connected to computer device 400. Computer device 400 further includes network interface(s) 440 for communications between computer device 400 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for controlling dispatching work tasks in a multi-tier storage environment, the method comprising:
receiving, by a computer system, storage demands of work tasks;
determining, by the computer system, placement and migration policies for data in storage tiers in a storage system;
preparing, by the computer system, the storage tiers for meeting the storage demands of work tasks, based on the placement and migration policies;
determining, by the computer system, a state of preparation of the storage tiers for meeting the storage demands of work tasks;
determining, by the computer system, a list including work tasks that can proceed and work tasks that cannot proceed, based on the state of the preparation;
modifying, by the computer system, a schedule of the work tasks, based on the list;

dispatching, by the computer system, a work task for which the preparation of the storage tiers has been completed;

starting, by the computer system, portions of a work task in proportion to capacities that have been prepared;

wherein the determining the placement and migration policies for the data in the storage tiers in the storage system further comprises:

determining, by the computer system, how much data to be created in respective ones of the storage tiers by respective ones of the work tasks and how much data to be accessed in the respective ones of the storage tiers by the respective ones of the work tasks;

determining, by the computer system, aggregated data creation rates and aggregated data access rates in the respective ones of the storage tiers;

checking, by the computer system, positions of the data to be accessed against performance characteristics of the respective ones of the storage tiers;

determining, by the computer system, to migrate data to be accessed from slower storage tiers to target storage tiers that satisfy minimum performance and are least costly, by determining the slower storage tiers having lowest aggregated data creation rates and aggregated data access rates;

determining, by the computer system, whether an amount of the data to be created is greater than free spaces in the target storage tiers;

in response to determining that the amount of the data to be created is greater than the free spaces in the target storage tiers, determining, by the computer system, an amount of spaces to be freed in the target storage tiers, and determining, by the computer system, to migrate data owned by users who are not in a list of user IDs of the work tasks;

freeing, by the computer system, space in the targeted storage tiers; and migrating, by the computer system, the determined data to the targeted storage tiers.

2. The method of claim 1, further comprising:
delaying, by the computer system, dispatching a work task for which the preparation of the storage tiers has not been completed.

3. The method of claim 1, further comprising:
in response to determining that the amount of the data to be created is not greater than the free spaces in the target storage tiers, determining, by the computer system, not to migrate data in the target storage tiers.

4. A computer program product for controlling dispatching work tasks in a multi-tier storage environment, the computer program product comprising a computer readable storage medium having program code embodied therewith, the program code executable to:

receive, by a computer system, storage demands of work tasks;

determine, by the computer system, placement and migration policies for data in storage tiers in a storage system;

prepare, by the computer system, the storage tiers for meeting the storage demands of work tasks, based on the placement and migration policies;

determine, by the computer system, a state of preparation of the storage tiers for meeting the storage demands of work tasks;

determine, by the computer system, a list including work tasks that can proceed and work tasks that cannot proceed, based on the state of the preparation;

modify, by the computer system, a schedule of the work tasks, based on the list;

dispatch, by the computer system, a work task for which the preparation of the storage tiers has been completed;

start, by the computer system, portions of a work task in proportion to capacities that have been prepared;

wherein the program code executable to determine the placement and migration policies for the data in the storage tiers in the storage system further comprises:

determine, by the computer system, how much data to be created in respective ones of the storage tiers by respective ones of the work tasks and how much data to be accessed in the respective ones of the storage tiers by the respective ones of the work tasks;

determine, by the computer system, aggregated data creation rates and aggregated data access rates in the respective ones of the storage tiers;

check, by the computer system, positions of the data to be accessed against performance characteristics of the respective ones of the storage tiers;

determine, by the computer system, to migrate the data to be accessed from slower storage tiers to target storage tiers that satisfy minimum performance and are least costly, by determining the slower storage tiers having the lowest aggregated data creation rates and aggregated data access rates;

determine, by the computer system, whether an amount of the data to be created is greater than free spaces in the target storage tiers;

in response to determining that the amount of the data to be created is greater than the free spaces in the target storage tiers, determine, by the computer system, an amount of spaces to be freed in the target storage tiers, and determine, by the computer system, to migrate data owned by users who are not in a list of user IDs of the work tasks;

free, by the computer system, space in the targeted storage tiers; and migrate, by the computer system, the determined data to the targeted storage tiers.

5. The computer program product of claim 4, further comprising the program code executable to:
delay, by the computer system, dispatching a work task for which the preparation of the storage tiers has not been completed.

6. The computer program product of claim 4, further comprising the program code executable to:
in response to determining that the amount of the data to be created is not greater than the free spaces in the target storage tiers, determine, by the computer system, not to migrate data in the target storage tiers.

7. A computer system for controlling dispatching work tasks in a multi-tier storage environment, the computer system comprising:

one or more processors, one or more computer readable tangible storage devices, and program instructions stored on at least one of the one or more computer readable tangible storage devices for execution by at least one of the one or more processors, the program instructions executable to:

receive storage demands of work tasks;

determine placement and migration policies for data in storage tiers in a storage system;

prepare the storage tiers for meeting the storage demands of work tasks, based on the placement and migration policies;

determine a state of preparation of the storage tiers for meeting the storage demands of work tasks;

determine a list including work tasks that can proceed and work tasks that cannot proceed, based on the state of the preparation;

modify, by the computer system, a schedule of the work tasks, based on the list;

dispatch, by the computer system, a work task for which the preparation of the storage tiers has been completed;

starting, by the computer system, portions of a work task in proportion to capacities that have been prepared;

wherein the program instructions executable to determine the placement and migration policies for the data in the storage tiers in the storage system further comprise:

determine, by the computer system, how much data to be created in respective ones of the storage tiers by respective ones of the work tasks and how much data to be accessed in the respective ones of the storage tiers by the respective ones of the work tasks;

determine, by the computer system, aggregated data creation rates and aggregated data access rates in the respective ones of the storage tiers;

check positions of the data to be accessed against performance characteristics of the respective ones of the storage tiers;

determine, by the computer system, to migrate the data to be accessed from slower storage tiers to target storage tiers that satisfy minimum performance and are least costly, by determining the slower storage tiers having the lowest aggregated data creation rates and aggregated data access rates;

determine, by the computer system, whether an amount of the data to be created is greater than free spaces in the target storage tiers;

in response to determining that the amount of the data to be created is greater than the free spaces in the target storage tiers, determine, by the computer system, an amount of spaces to be freed in the target storage tiers, and determine, by the computer system, to migrate data owned by users who are not in a list of user IDs of the work tasks;

free, by the computer system, space in the targeted storage tiers; and migrate, by the computer system, the determined data to the targeted storage tiers.

8. The computer system of claim 7, further comprising the program instructions executable to:

delay dispatching a work task for which the preparation of the storage tiers has not been completed.

9. The computer system of claim 7, further comprising the program instructions executable to:

in response to determining that the amount of the data to be created is not greater than the free spaces in the target storage tiers, determine not to migrate data in the target storage tiers.

* * * * *